United States Patent [19]
Hochuli et al.

[11] Patent Number: 6,015,954
[45] Date of Patent: *Jan. 18, 2000

[54] MULTI-LAYER BALLISTIC CABLE PROTECTOR

[75] Inventors: Martin Hochuli; Robert Dietrich, both of Domat/Ems, Switzerland

[73] Assignee: Ems-Inventa AG, Zürich, Switzerland

[ * ] Notice: This patent issued on a continued prosecution application filed under 37 CFR 1.53(d), and is subject to the twenty year patent term provisions of 35 U.S.C. 154(a)(2).

[21] Appl. No.: 08/838,053

[22] Filed: Apr. 22, 1997

[30] Foreign Application Priority Data

Apr. 24, 1996 [DE] Germany ............................ 196 16 374
Mar. 20, 1997 [EP] European Pat. Off. .............. 97104769

[51] Int. Cl.⁷ ...................................................... H01B 7/00
[52] U.S. Cl. .................................. 174/110 R; 174/121 R; 174/122 R
[58] Field of Search ............................ 174/121 R, 122 R, 174/122 G, 122 C, 124 R, 124 G, 124 GC, 102 R, 110 N, 110 R

[56] References Cited

U.S. PATENT DOCUMENTS

| 3,980,807 | 9/1976 | Woytiuk ................................... 174/107 |
| 4,096,351 | 6/1978 | Wargin et al. ....................... 174/102 R |
| 4,256,921 | 3/1981 | Bahder .................................... 174/107 |
| 4,957,966 | 9/1990 | Nishio et al. ............................. 525/66 |
| 5,306,868 | 4/1994 | Faust et al. ........................... 174/23 R |

OTHER PUBLICATIONS

IN 93/4364, "Twaron Aramid As Shielding Member", Akzo Nobel, pp. 4, 9, 10, Mar., 1994.

*Primary Examiner*—Kristine Kincaid
*Assistant Examiner*—William H. Mayo, III
*Attorney, Agent, or Firm*—Browdy and Neimark

[57] ABSTRACT

The invention relates to a multi-layer ballistic cable protector in which additional fiber sheathing layers are replaced by hard, impact-resistant or impact-resistance modified plastic sheathing layers and, if desired, by further soft plastic damping layers.

20 Claims, 2 Drawing Sheets

MULTI-LAYER BALLISTIC CABLE PROTECTOR

FIELD OF THE INVENTION

The invention relates to a multi-layer ballistic cable protector, particularly for optical communication cables.

BACKGROUND OF THE INVENTION

Cables suspended in the air are repeatedly the target of hunters shooting at birds. In order to protect sensitive optical waveguides (LWL) of optical communication cables against damage by ballistic shot (rounds of shot), in accordance with the prior art the optical waveguides (LWL) in the cable core (KK) are protected by several layers of aramide fabric (AG). In order to obtain a sufficient protective effect, at least two layers of aramide fabric of a strength of 550 g/m$^2$ are required (see FIG. 1 and list of reference numerals on page 6). For actually fully effective protection, even three layers of aramide fabric are recommended (FIG. 2).

The disadvantage of this solution is the high cost. A cable with a complete ballistic protection of aramide is twice as expensive as a comparable, unprotected cable.

OBJECT AND SUMMARY OF THE INVENTION

It is the object of the invention to discover a suitable sheathing structure to serve as a cable protector, which offers equal, but less expensive protection than the solution known from the prior art consisting of several layers of aramide fabric, and to develop a cable with such a cable protection.

This object is attained by the multi-layer ballistic cable protector having a partial substitution of the cost-intensive fiber sheathing layers used in the prior art by protective layers made of plastic.

DETAILED DESCRIPTION OF THE PREFERRED EMBODIMENTS

Figure 3:
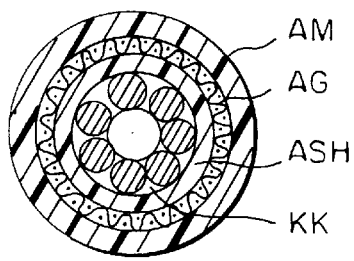
FIG. 3 shows an optical communication cable with ballistic protection made of one layer of aramide fabric and a plastic sheathing layer.

A preferred embodiment consists of a multi-layer structure made of a) a fiber sheathing layer, which preferably includes fabrics made of fibers or filaments, or threads under tensile stress which are disposed longitudinally parallel next to each other and consist of aramide fibers, glass fibers, carbon fibers and high-strength synthetic fibers, wherein aramide fibers are preferred, and b) at least one hard impact-resistant or impact-resistance modified plastic sheathing layer, which preferably consists of extremely impact-resistance modified plastic having a modulus of elasticity between 200 and 2000 N/mm$^2$, as well as a minimum Charpy notched impact strength of 10 kJ/m$^2$ and a minimum penetration energy of 60 Nm, measured following DIN 53 373, and is preferably selected from the group of polyamides, polyesters, polyester elastomers, polyurethanes, their blends and their blends with other plastics from the group of polyolefins as well, wherein polyamide is particularly preferred (FIG. 3).

Figure 4:
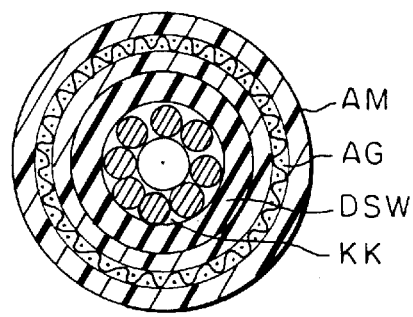
FIG. 4 is a variant of an optical communication cable with ballistic protection made of one layer of aramide fabric, a plastic sheathing layer and a damping layer.

Preferred embodiments have at least one further damping layer of a soft plastic, which is preferably selected from the group of thermoplastic elastomers, such as polyamide elastomers or polyester elastomers and polyolefins, is particularly energy-absorbent and advantageously lies underneath the layer a) and b) (FIG. 4).

A soft damping layer (c) is particularly recommended for communication cables with stranded single-fiber loose buffers.

Figure 1:
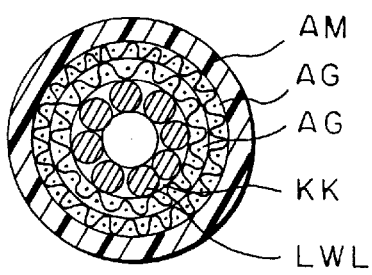
FIG. 1 shows an optical communication cable with ballistic protection made of two layers of aramide fabric (in accordance with the prior art)
Figure 2:
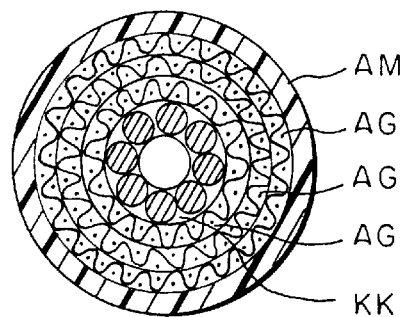
FIG. 2 shows an optical communication cable with ballistic protection made of three layers of aramide fabric.

At least one outer protective layer of a polyolefin preferably forms the outermost sheath (ÄM) of the cable protection, the same as in the known solutions of the prior art (FIGS. 1 and 2).

Figure 5:
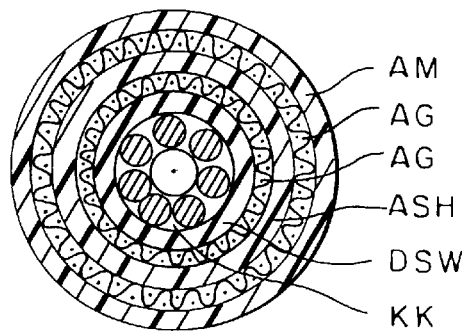
FIG. 5 is a further variant of an optical communication cable with ballistic protection made of one layer of aramide fabric, a plastic layer and a damping layer located under an inner fibrous tissue.

A further variant is represented by a sheathing structure consisting of an outer aramide fiber fabric (AG), a central sheathing plastic layer (ASH) made of a relatively hard impact-resistant or impact-resistance modified plastic, a further aramide fabric located underneath it and selectively a further damping layer (DSH) of a soft plastic lying under that (FIG. 5). As already previously mentioned in the course of the description of FIG. 3, the aramide fiber fabric can also consist of preferably longitudinally parallel aramide threads.

Figure 6:
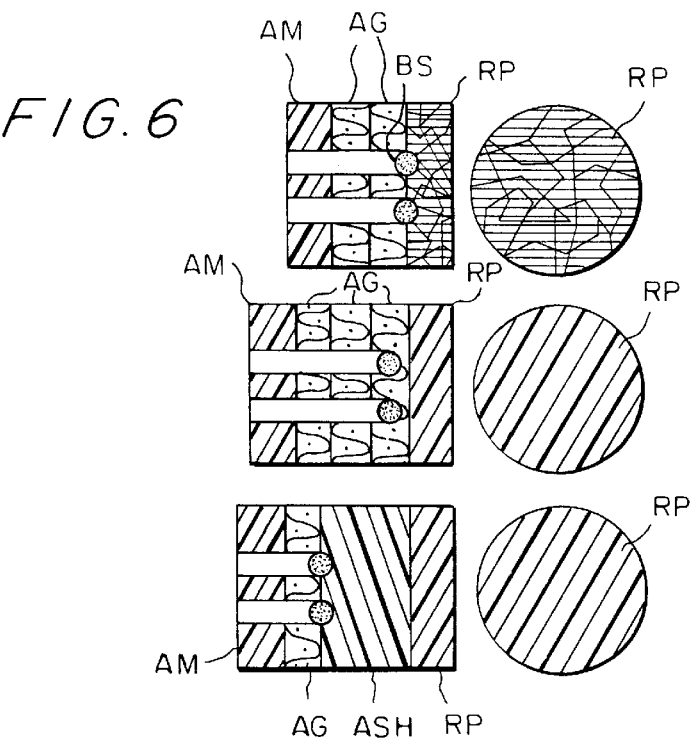
FIG. 6 is a basic representation of the bombardment evaluation criteria by means of a reference plate.

In bombardment tests on plates it could be shown that sheathing made of a layer of aramide fabric of a strength of 400 g/m$^2$ with a 1.6 mm thick sheathing layer underneath, made of an impact-resistant polyamide, offers the equivalent protection of three layers of aramide fabric of the same strength without an additional sheathing layer of impact-resistant plastic (FIG. 6).

A cable protection with at least one 1.6 mm thick plastic sheathing layer therefore represents a particularly preferred embodiment, while the thickness of this layer generally is preferably 0.5 mm.

Figure 7:
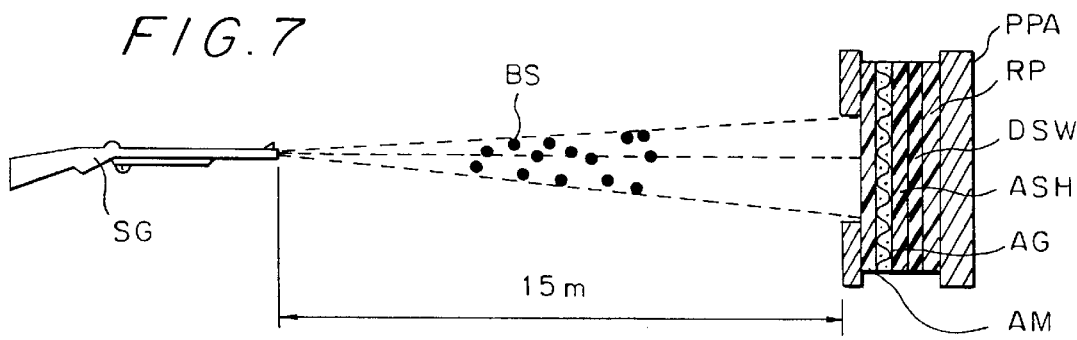
FIG. 7 is a schematic representation of a bombardment test format.

The test arrangement is represented in FIG. 7. The test plate holder (PPA) is bombarded with lead shot (BS) No. 5 from a 12/70 caliber shotgun (SG) from a distance of 15 m. A 0.8 mm thick polyethylene plate (AM) is always inserted as the first plate. The last plate, which lies directly on the steel plate, is made of a brittle plastic and is used as the reference plate (RP). The sheathing plates or fabrics to be tested lie between them. The penetration depth of the lead pellets and the state of the reference plate were evaluated (FIG. 6).

Impact-resistance modified polyamides having a modulus of elasticity in the range between 200 and 2000 N/mm$^2$ and a Charpy notched impact strength of greater than 10 kJ/m$^2$, for example Grilamid XE3574® or Grilon XE3501® of the EMS-CHEMIE AG company of Zürich were shown to be particularly suitable sheathing materials. Impact-resistance modified polyesters, or impact resistant polyurethanes and polyelastomers are also suitable.

The bombardment tests showed that in certain cases the waveguide sheaths located underneath has tears, although the sheathing covers had not been penetrated by individual lead pellets.

For this reason embodiments of the cable protection in accordance with the invention with an additional damping layer made of a soft, impact-resistant plastic, for example a polyamide elastomer such as the type Grilamid ELY60® of the EMS-CHEMIE AG company, Zürich, or made of other polymers with similar properties, are particularly advantageous.

The invention also includes the use of the multi-layer ballistic cable protection in accordance with the invention as a sheathing and protection for optical communication cables.

Figure 8:
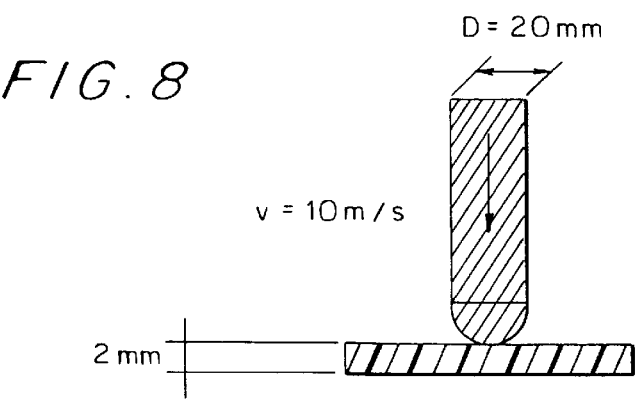
FIG. 8 is a basic representation of a penetration test.

To evaluate suitable sheathing materials, a penetration test following DIN 53373 (FIG. 8) was also performed. The penetration energy at room temperature was determined on 2 mm thick plates. The highest penetration energy was measured for impact-resistance modified polyamides.

| Material | Penetration Energy |
| --- | --- |
| Polyurethane | 65 Nm |
| HDPE | 60 Nm |
| TPE | 65 Nm |
| PA 6, unmodified | 40 Nm |
| PA 12, impact-resistance mod. | 120 Nm |
| Grilon XE3501 (PA 6,impact.resist.mod) | 125 Nm |

The sheathing structures described in the invention are not only suitable for optical communication cables with stranded multifiber loose buffers, as represented in FIGS. 1 to 5, but also for communication cables with a central multifiber loose buffer, a grooved central element, a so-called "slotted core", and other known cable core structures.

The cable protection in accordance with the invention is particularly distinguished by a particularly good price/performance ratio.

List of Reference Symbols
AG Fiber sheathing layer (aramide fabric or parallel aramide threads)
AM Polyethylene plate
ASH Plastic sheathing layer
ÄM Outer sheath
BS Lead shot
DSH Damping layer
KK Cable core
LWL Waveguide
PPA Test plate holder
RP Reference plate
SG Shotgun

What is claimed is:

1. For an optical cable, a multi-layer ballistic cable protector comprising:
   (a) a fiber layer;
   (b) a hard impact-resistant plastic sheathing layer comprising an impact-resistant plastic having a modulus of elasticity between approximately 200 N/mm$^2$ and approximately 2000 N/mm$^2$, a Charpy notched impact strength of approximately at least 10 kJ/m$^2$, and a penetration energy of approximately at least 60 N-m as measured according to DIN 53 373;
   wherein the impact-resistant plastic is selected from a group consisting of polyamides, polyesters, polyester elastomers, and blends thereof;
   (c) an outer protective layer comprising polyolefin.

2. The cable protector according to claim 1, wherein the fiber layer comprises high-strength fibers selected from a group consisting of aramide fibers, glass fibers, high-strength synthetic fibers, and carbon fibers.

3. The cable protector according to claim 2, wherein the high strength fibers are woven into a fabric.

4. The cable protector according to claim 2, wherein the high strength fibers are disposed parallel to a longitudinal extension of the cable.

5. The cable protector according to claim 1, wherein the hard impact-resistant plastic comprises impact-resistant modified plastic.

6. The cable protector according to claim 1, wherein the impact-resistant sheathing plastic layer includes a wall thickness of approximately at least 0.5 mm.

7. The cable protector according to claim 1, wherein the impact-resistant sheathing plastic layer includes a wall thickness of approximately at least 1.6 mm.

8. The cable protector according to claim 1, wherein the impact-resistant sheathing layer is smoothly cylindrical.

9. For an optical cable, an impact-resistant multi-layer ballistic cable protector protecting against sharp impacts; the protector comprising from inside the cable protector to outside the cable protector:
   (a) a damping layer comprising a soft energy-absorbent plastic selected from a group consisting of polyamide elastomers and polyester elastomers;
   (b) a hard impact-resistant plastic sheathing layer surrounding the damping layer and comprising an impact-resistant plastic having a modulus of elasticity between approximately 200 N/mm$^2$ and approximately 2000 N/mm$^2$, a Charpy notched impact strength of approximately at least 10 kJ/m$^2$, and a penetration energy of approximately at least 60 N-m as measured according to DIN 53 373;
   wherein the impact-resistant plastic is selected from a group consisting of polyamides, polyesters, polyester elastomers, and blends thereof;
   (c) a fiber layer; and
   (d) an outer protective layer comprising polyolefin;
   whereby impacts are absorbed by the soft inner energy-absorbing plastic of the damping layer and the hard impact-resistant plastic of the sheathing layer.

10. The cable protector according to claim 9, comprising an additional intermediate fiber sheathing layer between the damping layer and the impact-resistant plastic sheathing layer.

11. The cable protector according to claim 9, wherein the fiber layer comprises high-strength fibers selected from a group consisting of aramide fibers, glass fibers, high-strength synthetic fibers, and carbon fibers.

12. The cable protector according to claim 11, wherein the fibers are woven into a fabric.

13. The cable protector according to claim 11, wherein the high strength fibers are disposed parallel to a longitudinal extension of the cable.

14. The cable protector according to claim 9, wherein the hard impact-resistant plastic comprises impact-resistant modified plastic.

15. The cable protector according to claim 9, wherein the soft energy absorbent plastic is impact-resistance modified.

16. The cable protector according to claim 9, wherein the impact-resistant sheathing plastic layer includes a wall thickness of approximately at least 0.5 mm.

17. The cable protector according to claim 9, wherein the impact-resistant sheathing plastic layer includes a wall thickness of approximately at least 1.6 mm.

18. The cable protector according to claim 9, wherein the impact-resistant sheathing plastic layer is smoothly cylindrical.

19. In a protected communication cable comprising a core for communication transmission and a multi-layer protective sheathing surrounding said core, the improvement wherein said multi-layer sheathing comprises

- a damping layer over said core, said damping layer comprising a soft energy-absorbing plastic selected from a group consisting of polyamide elastomers and polyester elastomers;
- a hard impact-resistant plastic sheathing layer having a thickness of at least 1.6 mm, above and surrounding said damping layer, said sheathing layer comprising an impact-resistant plastic having a modulus of elasticity between approximately 200 N/mm$^2$ and approximately 2000 N/mm$^2$, a Charpy notched impact strength of approximately at least 10 kJ/m$^2$, and a penetration energy of approximately at least 60 N-m as measured according to DIN 53 373, said impact-resistant plastic being selected from a group consisting of polyamides, polyesters, polyester elastomers, and blends thereof;
- a fiber layer above and surrounding said hard impact-resistant plastic sheathing layer, said fiber layer comprising high-strength fibers selected from a group consisting of aramide fibers, glass fibers and carbon fibers; and
- an outer protective layer over and surrounding said fiber sheathing layer, said outer protective layer comprising a polyolefin.

20. The multi-layer cable of claim 19, further comprising a second fiber layer between said damping layer and said hard impact-resistant plastic sheathing layer.

* * * * *